(12) United States Patent
Purpura (10) Patent No.: US 6,973,518 B2
(45) Date of Patent: Dec. 6, 2005

(54) MOBILE APPARATUS FOR CONFIGURING PORTABLE DEVICES TO BE USED ON-BOARD MOBILE PLATFORMS

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 09/950,265

(22) Filed: Sep. 10, 2001

(65) Prior Publication Data

US 2003/0051075 A1    Mar. 13, 2003

(51) Int. Cl.[7] .................. G06F 13/00; G06F 9/455; G06F 11/00; G06F 15/177
(52) U.S. Cl. .................. 710/104; 703/24; 703/27; 714/28; 709/220
(58) Field of Search .................. 710/104; 703/21–28, 703/13; 717/134, 121, 135; 725/76; 370/395.53; 709/228, 220–222; 714/43, 44, 28

(56) References Cited

U.S. PATENT DOCUMENTS

| | | | | |
|---|---|---|---|---|
| 5,583,874 | A  * | 12/1996 | Smith et al. ............... | 714/712 |
| 6,443,543 | B1 * | 9/2002  | Chiang ................... | 312/222.3 |
| 6,466,981 | B1 * | 10/2002 | Levy ..................... | 709/227 |
| 6,671,726 | B1 * | 12/2003 | Hanway .................. | 709/227 |
| 6,757,712 | B1 * | 6/2004  | Bastian et al. ............ | 709/206 |
| 2001/0036822 | A1 * | 11/2001 | Mead et al. .............. | 455/414 |
| 2002/0010633 | A1 * | 1/2002  | Brotherston ............... | 705/26 |
| 2002/0046296 | A1 * | 4/2002  | Kloba et al. .............. | 709/248 |
| 2002/0095484 | A1 * | 7/2002  | Pagani et al. ............. | 709/220 |
| 2002/0129338 | A1 * | 9/2002  | MacDonell ............... | 717/126 |
| 2002/0141385 | A1 * | 10/2002 | Wasik et al. ............. | 370/352 |
| 2002/0160773 | A1 * | 10/2002 | Gresham et al. .......... | 455/431 |
| 2002/0178451 | A1 * | 11/2002 | Ficco ..................... | 725/76 |
| 2003/0005192 | A1 * | 1/2003  | Swope et al. ............. | 710/104 |
| 2003/0047598 | A1 * | 3/2003  | Stahi et al. .............. | 235/380 |
| 2003/0048766 | A1 * | 3/2003  | D'Annunzio et al. ...... | 370/338 |

FOREIGN PATENT DOCUMENTS

| | | | |
|---|---|---|---|
| EP | 0 734 192 A2 | 3/1995 | |
| EP | 0 993 209 A2 | 9/1999 | |
| WO | WO 00/14987 | 3/2000 | |
| WO | WO 00/63806 | * 10/2000 | ........... G06F 17/60 |

OTHER PUBLICATIONS

Translation of EP0993209 A2, Sep. 1999.*
WO 00/28403.
WO 00/14987.

* cited by examiner

Primary Examiner—Tim Vo
Assistant Examiner—Nimesh Patel
(74) Attorney, Agent, or Firm—Harness Dickey & Pierce P.L.C.

(57) ABSTRACT

A mobile apparatus for configuring, testing or providing portable electronic devices for accessing an on-board system of a mobile platform provides a single convenient location for ensuring proper configuration. Portable electronic devices pre-configured for connection to the on-board system are easily tested and re-configured if needed. Further, external components, such as PC cards or disk drives may be provided for configuring the portable electronic devices for accessing the on-board system. Entire portable electronic devices having limited components also may be provided for accessing the on-board system.

20 Claims, 3 Drawing Sheets

MOBILE APPARATUS FOR CONFIGURING PORTABLE DEVICES TO BE USED ON-BOARD MOBILE PLATFORMS

FIELD OF THE INVENTION

The present invention relates generally to bi-directional electronic communication systems, and more particularly to configuring a portable device using a mobile apparatus to provide bi-directional communication on-board a mobile platform.

BACKGROUND OF THE INVENTION

The need to provide bi-directional data communication while in-transit is increasingly important. In particular, the use of portable electronic devices (e.g., laptop computers and Personal Digital Assistants (PDAs)) for electronic communication has become widespread, thereby making access to the electronic resources (e.g., Internet) more readily available while in-transit. For example, connection to the Internet from laptop computers is now available via cellular telephones, which themselves may provide direct Internet access. Further, Internet access is becoming increasingly available while on-board mobile platforms, including specifically aircrafts, and will soon be common on-board aircrafts. In particular, access to the Internet is available using on-board systems, such as the Connexion by Boeing™ system provided by the Boeing Company.

In general, in order to access the Internet or communicate electronically using a service provider, the device to be used for communication must be properly configured (i.e., necessary hardware and software must be installed). For example, when accessing the Internet using an Internet Service Provider (ISP), the proper configuration information and files must be installed within the electronic device (e.g., laptop computer). Further, a determination must be made as to the available communication and system components provided within the electronic device in order to configure these components for compatible data communication. However, it might also be determined that the communication or system components do not meet the minimum requirements to access the particular system or service.

There are various methods for providing the necessary configuration information to the electronic devices (e.g., portable devices) and include, for example: (1) downloaded electronically via the Internet from a specific Web-site; (2) on electronic media, such as a CD-ROM or disk; or (3) preloaded on the electronic device. If a user is unable to properly configure the electronic device, technical support may be provided on-line or by calling technical support. If the electronic device is still not properly configured, it may have to be diagnosed to determine if conflicts or other problems exist. This may be provided by the manufacturer of the electronic device and/or special technical support groups, and may require further hardware testing. This process is often very inconvenient and time-consuming. Further, the configuration of the electronic device may only be provided because a particular communication interface is needed for a one time or limited duration event (i.e., limited free access to a service), thereafter to be restored to the initial settings, thus, creating further frustration.

With respect to configuring an electronic device for communication with systems on-board mobile platforms in order to access, for example, the Internet, it is particularly important that the electronic device is properly configured for operation with the on-board system before attempting use while in-transit, especially in aircrafts. For example, after boarding an aircraft, it is virtually impossible to trouble shoot an electronic device that is not properly configured for communication with the on-board system. Generally, a user will have to attempt to reconfigure the electronic device or obtain technical support after the aircraft has reached its destination. Thus, if the electronic device is not properly configured before in-transit operation, the electronic device will be unable to access on-board systems and is much less useful while on-board the mobile platform (e.g., unable to communicate electronically via the Internet).

Thus, there exists a need to provide an apparatus and method for conveniently and easily confirming proper configuration of an electronic device before use in-transit, or for configuring the electronic device if not already or properly configured, to thereby ensure communication with on-board systems while in-transit on a mobile platform (i.e., use on-board communication services). The apparatus needs to verify the hardware and software configuration of different types of devices to ensure proper operation in connection with on-board systems (i.e., proprietary services).

SUMMARY OF THE INVENTION

Generally, when configuring an electronic device to communicate with a particular system or network (e.g., to provide a point-of-presence on the Internet), not only does specific configuration information have to be provided to the electronic device (i.e., software loaded onto the device), but the hardware capabilities of the electronic device must be determined.

The present invention provides a mobile apparatus and method of providing the same that tests portable electronic devices to ensure proper configuration if preinstallation of software has been provided, or otherwise configures the electronic device for proper operation while in-transit on-board a mobile platform. Necessary software to be installed on the portable electronic devices to provide the configuration information may be accessed using different procedures or processes. The present invention provides for testing the electronic device for proper configuration after installation, as well as configuring improperly configured devices or devices not yet configured.

For example, a user may log onto a specialized Web site via the Internet, and once connected, the Web site will perform specific procedures to examine the hardware and software configuration of the electronic device, including determining if it contains the minimum capabilities needed to access the system or network. If the necessary hardware capability is present, configuration information may be provided to the electronic device to allow for different types of connections. Hardware support to provide these different connections may include, for example the following: (1) an Ethernet 802.11B wireless connection; (2) a USB port with active device drivers and TCP/IP support; or (3) an Ethernet port with TCP/IP support. If appropriate hardware support is not available, modifications to the electronic device will be necessary (e.g., hardware upgrade).

In operation, once the hardware is verified, the Web site typically will load a standalone software program onto the electronic device, which may include providing an icon on the electronic device (e.g., a laptop's desktop) to facilitate access to the system or network. A user will then simply activate (e.g., "double click") the icon to connect to the system or network to access, for example, on-board services. Before a first connection to the system or network, the software may require that the user to specify the connection method to be used (i.e., USB, wireless or Ethernet). Thereafter, a determination is preferably made as to the Internet browser and mail service to be used, and appropriate configuration information is provided for the Internet browser and mail service to access the system or network to thereby provide service. If a user plans to connect an electronic device to another system while on-board the mobile platform (e.g., corporate server), the software will request the data needed to locate and gain access to that system. Further, the software may obtain billing data from the user to cover payment for the service when it is used. After completing the initial setup process the user will simply activate the icon to connect to and use the system or network (e.g., on-board system).

Alternately, electronic media, such as, for example, a CD-ROM, may provide configuration information to the electronic device. The electronic media may be distributed in any known manner, including, for example, at trade shows, by direct mail, as tie-ins with other mass distributed electronic media (e.g., AOL CD-ROM), or other suitable distribution means. The electronic media allows for pre-installation of software for accessing the system or network without using the Internet. The electronic media preferably contains all the software described above and required to configure the electronic device for use while in-transit on-board the mobile platform to communicate with on-board systems.

The software needed to access the on-board systems also may be pre-installed on new electronic devices (e.g., laptops). In such installations, the users may be required to enter billing data (i.e., credit card information) after a demonstration period expires in order to complete software setup on the new electronic device.

If software to access systems on-board the mobile platforms is installed on an electronic device, the present invention generally provides for confirming or verifying proper setup (i.e., installation of proper configuration files), which is performed prior to entering the mobile platform. If the electronic device has not been configured, the necessary software is provided on-site (i.e., at the airport terminal) via, for example, local download or on prerecorded media. Additionally, external hard disks may be provided if a user does not desire to download the software to their electronic device (e.g., not enough storage space or privacy concerns). Further, if the electronic device is incapable of loading the software, or the system hardware requirements are lower than those required by the system on-board the mobile platform, such that it will not work in connection with the system, a stand alone electronic device may be provided for use while in-transit (i.e., a loaner electronic device). Such loaner electronic device may also be provided if the user does not have an electronic device for accessing the system on-board the mobile platform.

Generally, the present invention provides a mobile apparatus (e.g., kiosk or wheeled cart) for conveniently and easily confirming or verifying the installation of software on a portable electronic device needed to access systems on-board a mobile platform as described herein. Further, if the software is not properly installed, such that the portable electronic device is not properly configured, the present invention provides for reconfiguring the electronic device. If no configuration of the electronic device was provided, the present invention provides for configuring the electronic device for use on-board the mobile platform to access on-board electronic services. If no portable electronic device is available, the present invention also may provide a pre-configured portable electronic device for use while in-transit to access the systems on-board the mobile platform.

Specifically, in one preferred embodiment of the present invention, a mobile apparatus having wheels (e.g., a cart) and adapted for ensuring proper configuration of portable devices for use in communication on-board a mobile platform is provided. The mobile device includes means for configuring the portable devices for use on-board the mobile platform to provide communication (e.g., access electronic services from a proprietary system) and means for testing configured portable devices to ensure compatibility with the system on-board the mobile platform to thereby provide communication. Testing may be provided on portable devices configured according to the present invention, or configured according to one of the other methods as described herein.

The means for configuring the portable devices preferably include the following: (1) connection means for connecting the portable devices to a memory portion for obtaining configuration information; (2) an input/output device adapted for connection to the portable devices and containing configuration information therein; and (3) electronic media for installation within the portable devices to provide configuration information. Further, support means may be provided for storing pre-configured portable devices.

Additionally, means for simulating the system on-board the mobile platform (i.e., services provided while in-transit) for use in testing configured portable devices may be provided, and includes means for providing confirmation of a properly configured portable device.

The means for testing may include a plurality of connection members adapted for connection to different types of portable devices. The portable devices may comprise portable computers and the terminal may be an airport terminal with the mobile apparatus constructed as a cart to provide the means for configuring and the means for testing.

In another preferred embodiment, a system of the present invention provides for configuring portable devices for operation in connection with a mobile platform, such as, for example, a proprietary system on-board the mobile platform. The mobile device includes a support portion for storing pre-configured portable devices adapted for operation in connection with the mobile platform, a memory portion accessible by portable devices for obtaining configuration information needed to configure the portable devices for operation in connection with the mobile platform, and a testing portion for testing the portable devices to confirm proper configuration for operation in connection with the mobile platform. These portions are adapted to together be provided within a mobile wheeled cart at a terminal for the mobile platform (e.g., airport terminal).

The testing portion may include a plurality of connections adapted for connecting to different types of portable devices. Removable storage devices having configuration information therein may be provided that are adapted for removal from the mobile wheeled cart and connected to the portable devices.

The removable storage devices may include: (1) recordable media; or (2) a plurality of memory cards adapted for connection to the portable device, and wherein the memory cards may be PCMCIA configured. A printer may also be included as part of the mobile apparatus for providing a report of test results performed on a portable devices using the testing portion.

A method of the present invention provides for configuring portable devices at a mobile platform terminal to access a system on-board a mobile platform and communicate therewith. The method comprises the steps of configuring the portable devices at the terminal for accessing the system on-board the mobile platform and testing the portable devices at the terminal prior to accessing the system on-board the mobile platform to ensure proper configuration.

The method may also include providing pre-configured portable devices using the steps of configuring and testing. Further, a removable interface adapted for connection to the portable devices to provide the step of configuring may be used. Additionally, simulating systems on-board the mobile platform for use in testing the portable devices, and providing results relating to the testing of the portable devices may be provided.

Thus, the present invention provides a mobile apparatus for conveniently and easily ensuring that portable devices are properly configured for accessing systems on-board mobile platforms. Portable devices may be tested, configured or reconfigured to provide proper operation and connectivity before traveling on the mobile platform (e.g., aircraft).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although an apparatus of the present invention is described with certain component parts constructed and configured in a particular manner, it is not so limited, and variations in design are contemplated by the inventor.

The present invention provides a system, which as described herein in exemplary form is constructed as a mobile apparatus (e.g., a kiosk or wheeled cart), and method of providing the same that conveniently and quickly verifies the configuration of or configures a portable electronic device (e.g. a laptop) to ensure compatibility with a system on-board a mobile platform. Further, if the portable electronic device is incapable of operation with the system on-board the mobile platform, or if one is not available, the present invention provides means for connecting to and accessing the system while in-transit (e.g., a loaner laptop).

Figure 1:
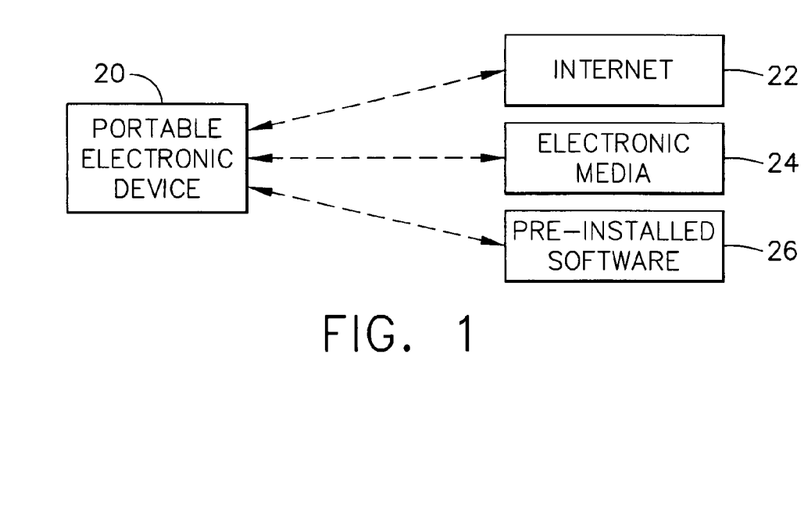
FIG. 1 is a simplified block diagram showing the various sources for use in configuring a portable electronic device.
Figure 2:
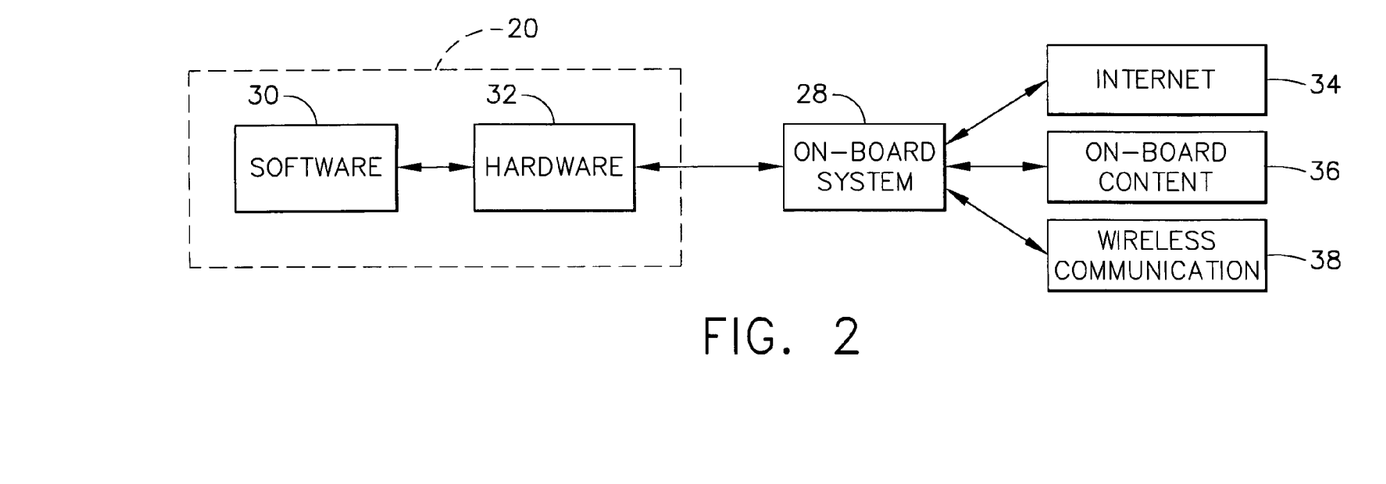
FIG. 2 is a simplified block diagram showing access to an on-board system using a portable electronic device configured using one of the sources as shown in FIG. 1.

With respect to configuring a portable electronic device for communication with a particular network or system (i.e., on-board system), and in particular using known methods for providing configuration information, this may be further understood with reference to FIGS. 1 and 2 by example. Thus, before further describing the invention, it is useful to understand the network or system in connection with which portable electronic devices configured according the present invention may be used, including the various sources of configuration information.

Generally, and as shown in FIG. 1, in order for an electronic device, and more particularly a portable electronic device 20 to communicate with a particular network or system (e.g., system on-board a mobile platform), the portable electronic device 20 must be configured to communicate with that network or system. It should be noted that the portable electronic device 20 typically must be specifically configured for each network or system with which communication is desired, including multiple systems accessed while on-board a mobile platform. This is particularly the case with portable electronic devices 20 and is needed because different networks and systems have different connection requirements with different data transmission protocols or methods.

Configuration information for portable electronic devices 20 may be provided from various sources, including, a specialized Web site via the Internet 22, using electronic media 24, or internally with pre-installed software 26. When configuring the portable electronic device 20 using configuration information from any of these sources, the hardware capabilities of the portable electronic device 20 are typically first determined, and thereafter appropriate software (e.g., device drivers) are installed to provide subsequent communication with a particular network or system.

For example, and with respect to operation while on-board mobile platforms (e.g., aircrafts), once the portable electronic device 20 is configured for connection and access to an on-board system 28 as shown in FIG. 2, the installed software 30 provides control of the required hardware 32 (e.g., Ethernet card or USB port with TCP/IP support) within the portable electronic device 20 to communicate with the on-board system 28. After a bi-directional communication link has been established between the portable electronic device 20 and the on-board system 28, access is provided to electronic services on-board the mobile platform. For example, access may be provided to the Internet 34, to on-board content 36 (e.g., stored video or audio content) or to wireless communication 38 capabilities.

Thus, in operation, and for example, a user may access email or other similar services while on-board a mobile platform via an on-board system 28 using a portable electronic device 20. It should be noted that connection to the on-board system 28 may be provided in any known manner and as required, such as, for example, through a Local Area Network (LAN) connection accessed via an Ethernet card installed within the portable electronic device 20. Further, the on-board system 28 may obtain stored content or may obtain real-time information (e.g., via the Internet 34) using, for example, satellite communication or other systems depending upon the mobile platform requirements.

Having described exemplary sources of configuration information and an exemplary system that may be accessed by a portable electronic device 20 configured accordingly, the present invention provides an apparatus and method for configuring and testing the portable electronic device 20. Generally an apparatus and method of the present invention ensures communication with the on-board system 28 using the portable electronic device 20 while therein (e.g., while in flight) as shown in FIGS. 3 and 4.

Figure 3:
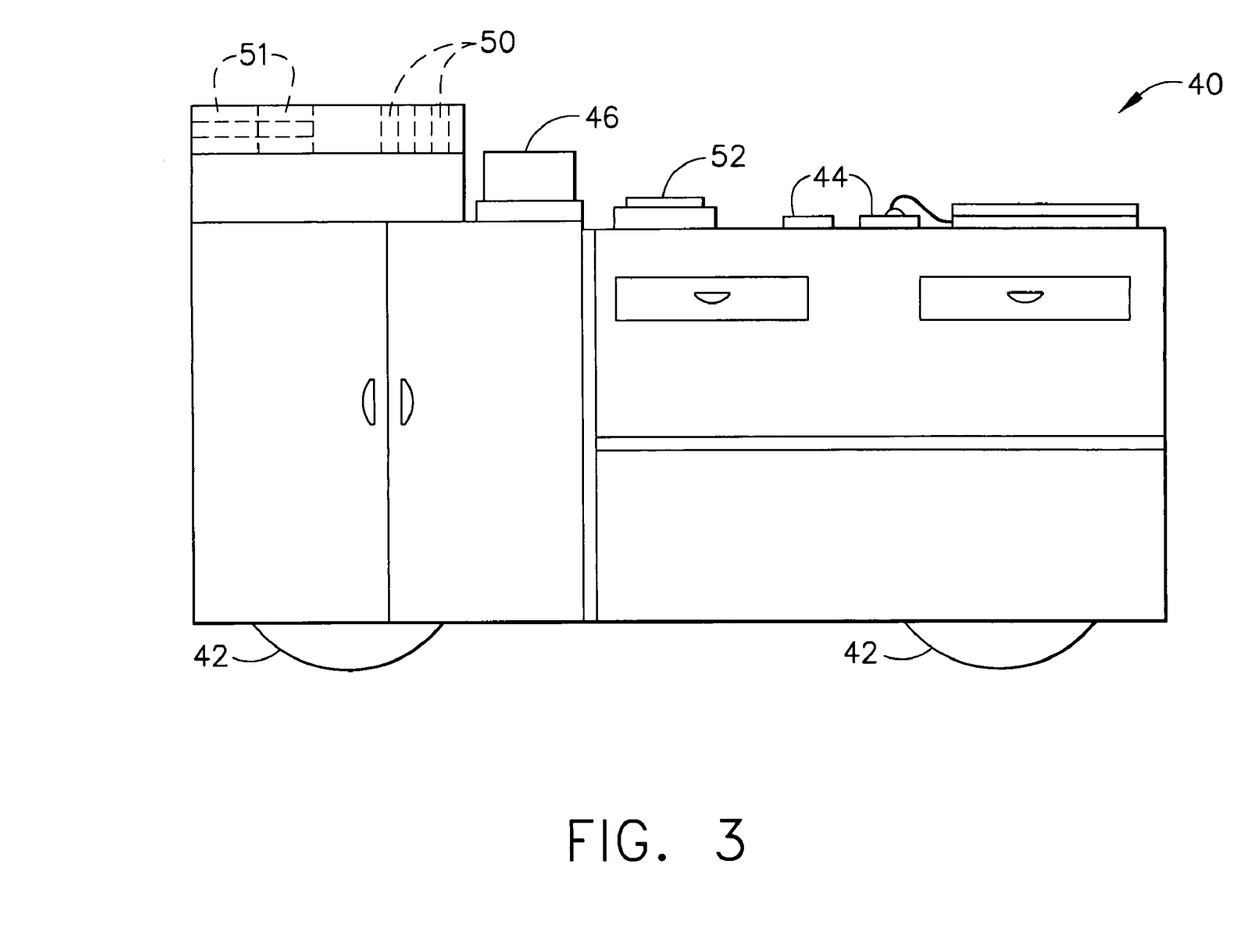
FIG. 3 is a front elevation view of a mobile apparatus for configuring and testing portable electronic devices according to the principles of the present invention.
Figure 4:
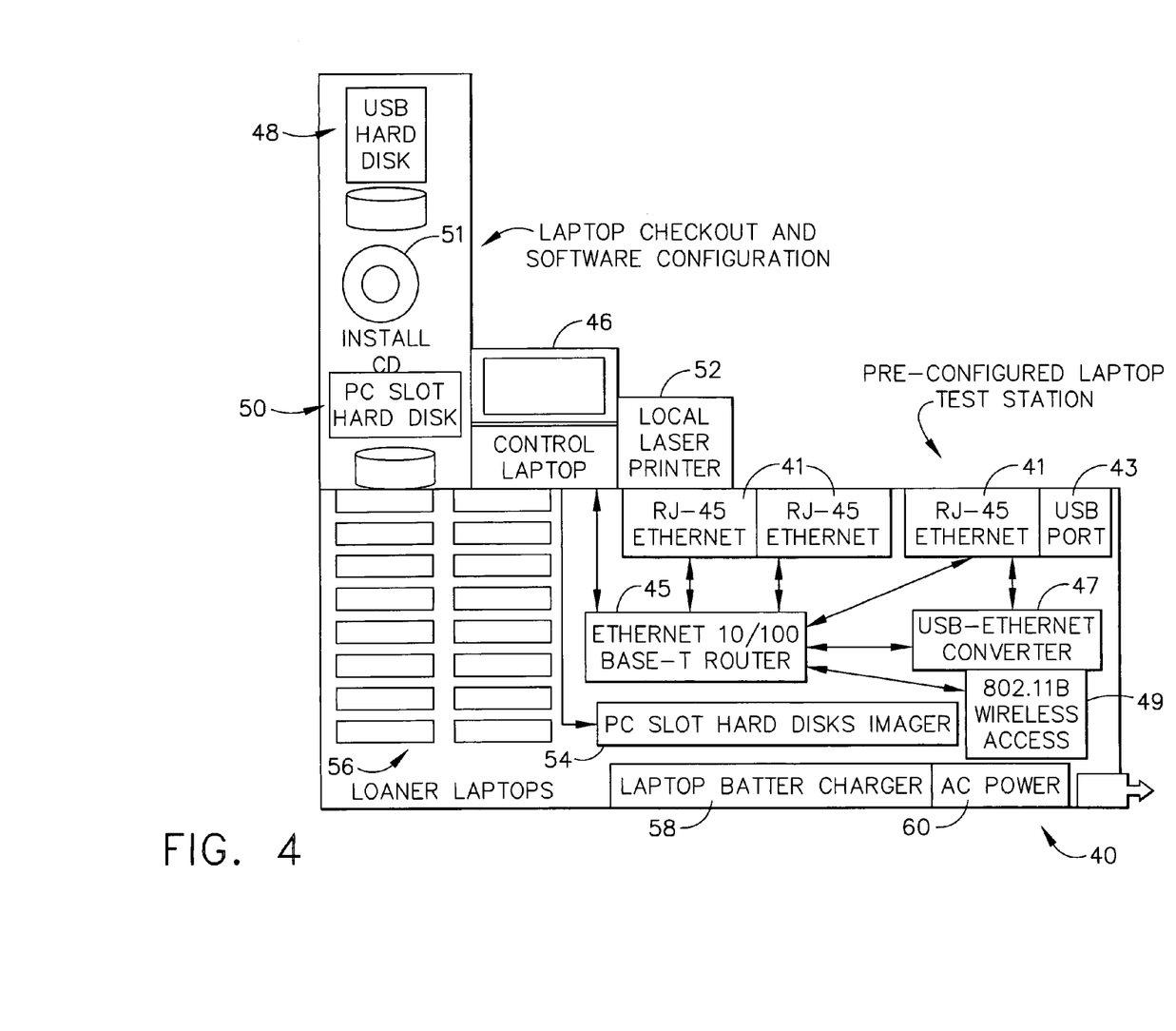
FIG. 4 is a schematic block diagram of the mobile apparatus of FIG. 3.

In particular, FIG. 3 shows a mobile apparatus in exemplary form constructed as a wheeled cart according to the principles of the present invention and designated generally by reference numeral 40. It should be noted that the mobile apparatus 40 may be used in connection with different types of portable electronic devices 20 operating on different systems and having varied communication requirements. Generally, the portable electronic devices 20 must have certain minimum capabilities to communicate with the on-board system 28, which capabilities are determined by the mobile apparatus 40 as described herein. The minimum capabilities for such portable electronic devices 20 are defined by the minimum requirements for communication with the on-board system 28. For example, minimum capabilities for the portable electronic devices 20 may include:

(1) A specific operating system or version of operating system;

(2) A minimum processor speed;

(3) A minimum amount of free storage space (e.g., disk drive space) for installing necessary configuration and communication software; and (4) Minimum input/output (I/O) capabilities, such as:

(a) a PC card slot, such as at least one available Personal Computer Memory Card International Association (PCMCIA) PC Card Standard Type II slot available on the portable electronic device 20 (if only one slot is available and used, the existing card may be removed);

(b) at least one available USB Port (any USB devices may be removed if needed to free up the port for testing purposes);

(c) an Ethernet port using, for example, an RJ-45 connector; or (d) a 802.11 B compatible wireless LAN port.

It should be noted that these requirements may be different depending upon the type of portable electronic device 20 (e.g., a Wintel or Apple laptop).

With respect to the mobile apparatus 40 constructed according to the principles of the present invention as shown in FIG. 3, it preferably provides the physical infrastructure for all required hardware and support components needed to configure, test, or re-configure, and generally provide a portable electronic device 20 for communication with the on-board system 28 as described herein.

Generally, the mobile apparatus 40 includes mounts and other support items to provide the various component parts for implementing the present invention including, for example, a control laptop, a local printer, loaner portable electronic devices (e.g., laptops), replaceable hard drives, electronic media (e.g., CDs), among others as described herein. The mobile apparatus 40 is preferably constructed such that it may be easily moved on a set of wheels 42. Further, the mobile apparatus 40 is also preferably constructed for easy transporting, and specifically adapted for collapsing such that it can fit into standard aircraft stowage locations for transport to various destinations. Further the mobile apparatus 40 is operable in different physical locations having different requirements, such as power requirements (e.g., both US and European AC power). Protection means are also included to provide a certain level of protection to prevent theft of the various items that will be provided in connection with and stored within the mobile apparatus 40.

The mobile apparatus 40 is adapted to perform multiple functions from a single location (e.g., airport terminal gate area) using, for example, multiple built-in automatic test devices and user accessible self-checkout and install systems. Further, the maintenance and management of pre-configured portable electronic devices (e.g., laptop PCs) is also provided.

Specifically, a mobile apparatus 40 constructed according to the principles of the present invention preferably provides the following functions:

(1) Portable electronic device 20 self-verification or testing;

(2) Initial software self install using various electronic media (e.g., CD-ROM or external hard drive);

(3) Installation of external storage device (e.g., hard drive); and (4) Loaner portable electronic device (e.g., laptop) checkout.

With respect to self-verification or testing of a portable electronic device 20, the portable electronic device 20 is connected to the mobile apparatus 40 via connectors 44 using an existing I/O device of the portable electronic device 20, such as, for example, a configured Wireless 802.11 B interface card, an RJ-45 connector Ethernet cable or a standard USB cable. It should be noted that self-verification or testing is provided for pre-configured portable electronic devices 20. These include devices that have appropriate software loaded thereon via, for example, the Internet 22, electronic media 24 or pre-installed on the portable electronic device 20 as shown in FIG. 1. Thus, the capabilities of these portable electronic devices 20 previously have been determined, and preferably, a quick connection access selector member (e.g., an icon on a laptop desktop) has been pre-installed on the portable electronic device 20 for activating the software to communicate with the on-board system 28.

In operation, once the quick connection selector member is activated on a portable electronic device 20 connected to the mobile apparatus 40 using an appropriate connector 44, the installed software attempts to connect to a Web site emulator provided on a control device, such as a control laptop 46 of the mobile apparatus 40. The control laptop 46 may be provided using any known PC laptop and is preferably securedly attached to the mobile apparatus 40. Further, the control laptop 46 is configured in any known manner to provide the Web site emulator functionality.

It should be noted that various types of connectors 44 are preferably provided to connect portable electronic devices 20 to the mobile apparatus 40. For example, and as shown in FIG. 4, multiple RJ-45 Ethernet connectors 41 and a USB port 43 may be provided. As shown therein, an Ethernet 10/100 Base-T Router 45 is provided to allow for bi-directional communication between a connected portable electronic device 20 and the control laptop 46. A USB-Ethernet converter 47 is also provided to provide bi-directional communication between a USB connected portable electronic device 20 and the control laptop 46 via the Ethernet 10/100 Base-T Router 45. Additional component parts or support members also may be provided, including, for example, a 802.11 B wireless access interface 49.

If a successful connection is established between the portable electronic device 20 and the control laptop 46 running the Web site emulator, an approval notification is provided on the control laptop 46 confirming the connection. The portable electronic device 20 is then physically disconnected from the mobile apparatus 40 and is ready for connection to the on-board system 28 (i.e., compatibility and configuration confirmed).

If a successful connection is not established (i.e., portable electronic device 20 fails to log on), the installed software preferably will exit with an appropriate error message provided by the control laptop 46. In a more preferred embodiment, the error message provides information to help an operator of the mobile apparatus 40 diagnose and determine the fault or error, and properly configure the electronic device 20. Examples of such diagnostic messages include:

1. "Failure to establish a basic connection", which error message may require the operator to perform one or more of the following actions:
   A. Confirm Ethernet/USB cables are secure;
   B. Confirm Ethernet cards are properly connected (i.e., inserted);
   C. Verify laptop is running under normal boot mode; or
   D. Confirm drivers are active in the system file.
2. "Inability to interface with browser", which error message may require the operator to perform one or more of the following actions:
   A. Confirm that no other programs are running that use resources required for proper browser operation (e.g., use of all available RAM by another program);
   B. Verify that browser is operational and active on the desktop; or
   C. Verify that any personal firewall software is not blocking access.

Thereafter, the portable electronic device 20 is reconfigured as described herein.

If a portable electronic device 20 is not configured for operation, such that no pre-installation of software has been provided, the present invention provides for configuring the portable electronic device 20. In particular, if the portable electronic device 20 includes a CD-ROM/DVD drive, an install compact disc (CD) 51 stored within the mobile apparatus 40 will be provided for execution that will verify the system configuration (i.e., hardware 32 capabilities) of the portable electronic device 20 and thereafter install the needed software 30. Once installation is complete, the portable electronic device 20 can be verified and tested as described above to confirm proper configuration.

If a CD-ROM/DVD drive is not installed or available on the portable electronic device 20, and the appropriate software has not been installed, either a USB based external hard disk 48 or a two gigabyte (2GB) PCMCIA Type II PC Card 50 (collectively "storage devices") may be connected to the portable electronic device 20 to access the needed software. It should be noted that both of these storage devices are preferably compatible with different operating environments (i.e., PC and Macintosh operating systems).

The storage devices when connected to the portable electronic device 20 allow access to install software via standard file manipulation tools of the portable electronic device 20 to perform required system checkout (i.e., determine hardware 32 capabilities) and software installation. Again, after installation is complete, self-verification or testing of the portable electronic device 20 may be provided as described above. The storage devices (i.e., drives) are preferably mounted to the portable device 40 in any suitable manner with access provided using known cable or insertion methods. Further, these storage devices are preferably maintained by the control laptop 46, which provides control functionality as needed, such as, for example, cleaning each storage device (i.e., erasing settings and personal information) after its use, and installing a fresh software image for the next user.

If a mobile electronic device 20 is hardware compliant and includes an available PC slot (i.e., PCMCIA Type II PC Card slot), but lacks the required install software, the present invention also provides for sampling the services provided by the on-board system 28 without loading the required software. Specifically, a PCMCIA Type II PC card 50 is loaded into a PC slot of the portable electronic device 20, which may be a laptop computer in this case, and a setup program is executed that copies critical files needed for communication with the portable electronic device 20 onto the external drive (i.e., PC card 50). It should be noted that the BIOS settings of the portable electronic device 20 are preferably changed to provide booting from the PC slot drive. A local printer 52 (e.g., laser printer) may be used to provide a hard copy of all original and changed settings, as well as full details for system recovery. This hard copy printout also provides a means for accounting for storage devices.

In operation, with the PC card 50 installed in the portable electronic device 20, access to the on-board system 28 is provided. Further, access to files existing on the portable electronic device 20, such as on a laptop hard drive, is also provided. The PC card 50 is returned after use and stored in the mobile apparatus 40. In connection with an aircraft environment, the PC card 50 may be returned in flight to on-board personnel, or upon landing to an operator of the mobile apparatus 40. Upon return of the PC card 50, all information on the PC card 50 is erased and the settings of the portable electronic device 20 are returned to their original condition. It should be noted that the PC cards 50 are also maintained by the control laptop 46, which provides control functionality as needed. Further, the mobile apparatus 40 provides for rapid reimaging of the PC cards 50 after each use, which may be provided by, for example, a common ganged PC slot external device as is known, and shown in FIG. 4 as a PC Slot Hard Disks Imager 54.

If a portable electronic device 20 is not available, such that it does not meet the minimum hardware 32 capabilities required to access the on-board system 28, or a user does not want the necessary software installed, loaner portable electronic devices, such as loaner laptops 56 stored within the mobile apparatus 40 are provided. Preferably, the loaner laptops 56 include all required software to access the on-board system 28 via a PCMCIA Type II PC Card 50 that is adapted for easy removal and re-imaging between uses. The operator of the mobile apparatus 40 preferably performs a user customization to personalize the loaner laptop 56 for a particular user. Again, the local printer 52 may be used to provide a hard copy of all settings, as well as provide a receipt for tracking the loaned hardware. A laptop battery charger 58 connected to AC power 60 is provided to recharge stored loaner laptops 56.

The loaner laptops 56 include standard mail and browser software, and preferably provide multiple language support, as well as the standard Microsoft® Office tool suite with multiple language support. Further, the loaner laptops 56 preferably do not include an internal hard disk, but include a DVD player to provide local entertainment (i.e., DVD movie viewing) if desired. Again, the removable PC cards 50 in the loaner laptops 56 are maintained by the control laptop 46, which provides control functionality as needed. The PC slot Hard Disks Imager 56 may be used to rapidly reimage the PC cards 50 after each use.

With respect to configuring the portable electronic devices 20 for communication with the on-board system 28, various configuration methods may be provided in connection with the sources shown in FIG. 1. Specifically, and for example, for Web based configuration software provided via the Internet 22, Java code may be provided and resides on a specific supported Web site for access to preconfigure the portable electronic devices 20 for use in later communication with the on-board system 28. The use of Java allows the code to configure different types of portable electronic devices 20 (i.e., both PC and Macintosh computers). The code preferably provides a non-invasive check of the portable electronic device 20 for minimum capabilities (i.e., adequate hardware 32 support). Essentially, a PC checkout service is provided that searches the portable electronic device 20 and determines software packages that are present, and may determine if updated versions are available for download.

Once the portable electronic device 20 is confirmed, such that it includes the minimum capabilities to access the on-board system 28 via, for example, an Ethernet, USB, or 802.11 B wireless connection, a quick connection selector member (i.e., icon) may be provided to the portable electronic device 20 (e.g., on a laptop desktop). If such a quick connection selector member is desired, the code determines the email, browser, and other key Internet settings of the portable electronic device 20, as well as the specifics of the user of the portable electronic device 20, and builds a standalone program that allows quick connection (e.g., single click) connect to the on-board system 28. Once the process is complete, configuration of the portable electronic device 20 may be verified and tested as described herein using a land-based emulator as part of the mobile apparatus 40.

For electronic media 24 based system configuration software, similar Java code may be provided to reside on a CD ROM media for distribution as either a standalone CD or as an addition to other mass distribution CDs (e.g., AOL, MSN, Netscape, or other communication software install disks). Again, the code would provide a non-invasive check of the portable electronic device 20 for minimum capabilities (i.e., adequate hardware 32 support).

Once the portable electronic device 20 is confirmed, such that it includes the minimum capabilities to access the on-board system 28 via, for example, an Ethernet, USB, or 802.11 B wireless, a quick connection selector member (i.e., icon) may be provided to the portable electronic device 20 (e.g., on a laptop desktop). If such a quick connection selector member is desired, the code determines the email, browser, and other key Internet settings of the portable electronic device 20, as well as the specifics of the user of the portable electronic device 20, and builds a standalone program that allows quick connection (e.g., single click) connect to the on-board system 28. Once the process is complete, configuration of the portable electronic device 20 may be verified and tested as described herein using a land-based emulator as part of the mobile apparatus 40.

For preinstalled software 26, a subset of the Java code described above is preferably provided for pre-loading on new portable electronic devices 20. Again, a quick connection selector member (i.e., icon) may be provided to the portable electronic device 20 (e.g., on a laptop desktop). If such a quick connection selector member is desired, the code determines the email, browser, and other key Internet settings of the portable electronic device 20, as well as the specifics of the user of the portable electronic device 20, and builds a standalone program that allows quick connection (e.g., single click) connect to the on-board system 28. Once the process is complete, configuration of the portable electronic device 20 may be verified and tested as described herein using a land-based emulator as part of the mobile apparatus 40.

For external boot configuration software, Java code is again provided, and a quick connection selector member (i.e., icon) may be provided. If a quick connection selector member is desired, the code determines the email, browser, and other key Internet settings of the portable electronic device 20, as well as the specifics of the user of the portable electronic device 20, and builds a standalone program that allows quick connection (e.g., single click) connect to the on-board system 28 and configures the PC card slot of the portable electronic device 20 accordingly for running the portable electronic device 20 therefrom. The Java code will also provide full details of the system configurations of the portable electronic device 20 copied, and generates a hard copy printout as described herein.

For loaner laptop 56 configuration software, Java code is provided that determines the email, browser, and other key Internet settings for a particular user, along with user information, and configures the loaner laptop 56 for temporary use.

For external hard disk re-imaging software, a Commercial-Off-The-Shelf (COTS) software preferably uses a script to erase and rebuild the various disk images that will be used on the external PC-Slot hard drives after each use.

Although the present invention has been described in connection with a mobile apparatus constructed with specific component parts and configured in a particular manner, it should be appreciated that additional or alternate component parts may be provided, and the mobile apparatus constructed according to the requirements of the mobile platform in connection with which portable devices configured according to the present invention may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mobile computing apparatus for use in ensuring proper configuration of at least one portable device to be used on-board a mobile platform, said apparatus comprising:
   a configuration module that directly interfaces with at least one portable device, communicatively connected to the mobile apparatus, with access software for accessing a local area network (LAN) on-board the mobile platform; and
   a control device including a Web site emulator, the control device adapted to operatively connect with the portable device and simulate an Internet connection, utilizing the Web site emulator, and on-board content provided by the LAN on-board the mobile platform upon activation of the access software to thereby test the portable device to ensure compatibility with the LAN on-board the mobile platform.

2. The mobile apparatus according to claim 1 wherein, the mobile apparatus further comprises a memory portion for obtaining configuration information when the portable device is communicatively connected.

3. The mobile apparatus according to claim 1 wherein the mobile apparatus further comprises an input/output device adapted to communicatively connect to the portable device for providing configuration information.

4. The mobile apparatus according to claim 1 wherein the mobile apparatus further comprises electronic media for installation within the portable device to provide configuration information.

5. The mobile apparatus according to claim 1 further comprising support means for storing at least one pre-configured portable device.

6. The mobile apparatus according to claim 1 further comprising means for providing confirmation of a properly configured portable device.

7. The mobile apparatus according to claim 1 wherein the portable device comprises at least one of a portable computer and a portable data assistant (PDA) and the mobile apparatus is constructed as a cart to provide the means for configuring.

8. The mobile apparatus according to claim 1, wherein the control device includes a Web site emulator for simulating the service the Internet connection and the on-board content provided by the LAN on-board the mobile platform.

9. A system for configuring portable devices for operation in connection with a subsystem of a mobile platform, the system provided at a terminal of the mobile platform and comprising:
 a support portion for storing pre-configured portable devices adapted for operation in connection with the subsystem of the mobile platform;
 a memory portion accessible by the portable devices for obtaining software needed to configure the portable devices for operation in connection with the subsystem of the mobile platform; and
 a testing portion including a control device including a Web site emulator, the control device adapted to communicatively connect with the portable devices and simulate an Internet connection, utilizing the Web site emulator, and on-board content provided by the subsystem on-board the mobile platform upon activation of the software to thereby test the portable devices to confirm proper configuration for operation in connection with the subsystem of the mobile platform.

10. The system according to claim 9 wherein the terminal is an airport terminal and the storage portion, memory portion and testing portion are adapted for implementation within a mobile wheeled cart provided at a gate area of the airport terminal.

11. The system according to claim 10 wherein the testing portion comprises a plurality of connections adapted for connection to different types of portable devices.

12. The system according to claim 10 further comprising removable storage devices having configuration information therein and adapted for removal from the mobile wheeled cart and connection to the portable devices.

13. The system according to claim 12 wherein the removable storage devices comprise recordable media.

14. The system according to claim 12 wherein the removable storage devices comprise memory cards adapted for connection to the portable devices.

15. The system according to claim 14 wherein the memory cards are PCMCIA configured.

16. The system according to claim 10 further comprising a printer for providing a report of test results performed on a portable device using the testing portion.

17. A method for configuring portable electronic devices at a mobile platform terminal to access a local area network (LAN) on-board the mobile platform and communicate therewith, the portable electronic devices carried on-board the mobile platform and the method comprising the steps of:
 configuring the portable electronic devices, utilizing a mobile apparatus at the terminal, with access software for accessing the system on-board the mobile platform;
 communicatively connecting the portable electronic devices to a control device of the mobile apparatus;
 simulating a connection of the portable electronic devices to the Internet utilizing a Web site emulator included in the control device;
 simulating on-board content provided by the LAN on-board the mobile platform using the control device; and
 activating the access software to access the simulated Internet connection and on-board content on the control device, thereby testing the portable electronic devices at the terminal prior to accessing the (LAN) on-board the mobile platform to ensure proper configuration for accessing the (LAN) on-board the mobile platform.

18. The method according to claim 17 further comprising providing pre-configured portable electronic devices using the steps of configuring and testing.

19. The method according to claim 17 further comprising using a removable interface adapted for connection to the portable electronic devices to provide the step of configuring.

20. The method according to claim 17, wherein simulating an Internet connection and on-board content provided by the LAN on-board the mobile platform comprises activating a Web site emulator provided on the control device for simulating the service the Internet connection and the on-board content.

* * * * *